July 17, 1928.
C. L. PRUIETT
1,677,848
STUFFING BOX
Filed Sept. 12, 1927
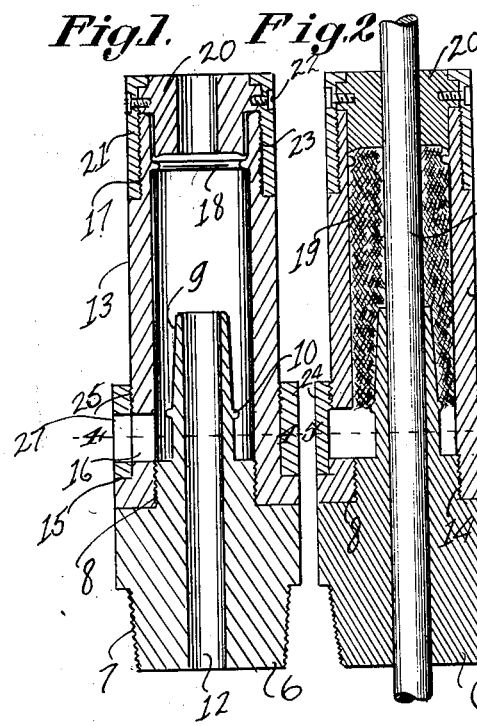
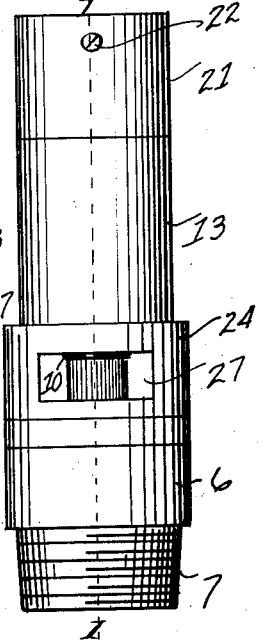
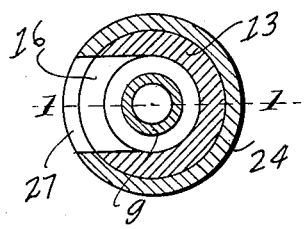
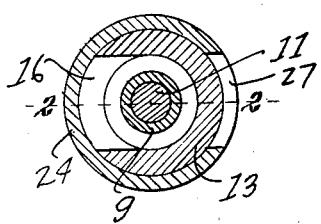
INVENTOR.
CHAS. PRUIETT
BY *Victor J. Evans*
ATTORNEYS.

Patented July 17, 1928.

1,677,848

UNITED STATES PATENT OFFICE.

CHARLES L. PRUIETT, OF OIL CENTER, CALIFORNIA.

STUFFING BOX.

Application filed September 12, 1927. Serial No. 219,038.

This invention relates to improvements in stuffing boxes and has particular reference to a stuffing box for oil and water wells.

The principal object of the invention is to provide a stuffing box of the character described that embodies in its construction, means whereby the box may be packed during the pumping operation of the well.

Another object of the invention is to provide a stuffing box construction which is economical to manufacture, simple in construction, highly efficient in use and wherein the parts may be readily assembled or disassembled.

Other objects and advantages will be apparent during the course of the following description.

In the accompanying drawings forming a part of this specification, and in which like numerals are employed to designate like parts throughout the same, Figure 1 is a vertical section through the stuffing box on the line 1—1 of Figure 4, Figure 2 is a similar view on the line 2—2 of Figure 5, disclosing the polish rod in elevation, Figure 3 is a side elevation of the stuffing box, Figure 4 is a horizontal section through the box on the line 4—4 of Figure 1, disclosing the cage collar in an open position, and Figure 5 is a horizontal section through the box on the line 5—5 of Figure 2, disclosing the cage collar in a closed position.

In packing stuffing boxes in oil or water wells, as far as I am aware, it has heretofore been necessary to cease the pumping of the well so that the stuffing box can be readily and quickly packed. Furthermore, packing tools have been employed which oftentimes mar the polish rod with the resultant loss of a comparatively new rod.

To overcome these disadvantages and for the purpose of effecting a saving in time and labor, I have devised an efficient stuffing box construction wherein the box may be packed during the pumping operation and furthermore eliminates packing tools that in themselves are costly and often by their contact, render the polish rod worthless.

In the accompanying drawings wherein for the purpose of illustration is shown a preferred embodiment of my invention, the numeral 6 designates the cylindrical base of the stuffing box, which is externally threaded as at 7 for ready connection with the well pipe (not disclosed). This base is provided with an externally threaded collar 8 of a smaller diameter than the base, which collar carries thereon a tapered sleeve 9 having on its outer periphery a retaining ring 10.

It will be noted that a polish rod 11 as disclosed to advantage in Figure 2, extends through the sleeve and the bore 12 of the cylindrical base. The numeral 13 designates a tubular packing cage or member provided with internal threads 14 adjacent its base for readily engaging the external threads of the collar 8.

The member 13 is also equipped with an external shoulder 15 and has provided therein an opening 16 through which access can be had to the interior of the cage.

It will be further noted that the member 13 is externally threaded adjacent its upper extremity as indicated by the numeral 17 and is also equipped with an internal upper retaining ring 18.

The packing, the easy removal of which is desired in the present invention, is indicated by the numeral 19 and in practice is shaped to the polish rod prior to the insertion of the material.

As disclosed to advantage in Figures 1 and 2, the numeral 20 designates a bushing or follower positioned in the upper extremity of the member 13, which bushing is secured to a cap 21 through the medium of fastening elements 22. The cap is internally threaded as at 23 for readily engaging the threads 17 of the member 13.

The construction thus described at the top of the stuffing box permits a ready entry to the same when it is desired to push the old packing below the top retaining ring 18.

Referring to Figures 1 and 3, the numeral 24 designates a cage collar which threadedly engages the member 13 as at 25 and rests on the shoulder 15. This collar is likewise provided with an aperture 27 which aperture registers with the opening 16 of the member 13 when the collar is rotated about the cage.

In practice when it is desired to remove old packing it is only necessary to unfasten the screw cap and push the packing below the resistance ring 18. Upon the insertion of a hook or similar removing medium, the packing is extracted through the openings 16 and 27 which have been brought into register.

After the extraction of the old packing, a new packing which has been shaped to the polish rod is inserted, which will be readily retained in position by virtue of the rings employed, as disclosed to advantage in Figure 2.

It is to be understood that the form of my invention herewith shown and described is to be taken as a preferred example of the same, and that various changes relative to the shape, size, material, and arrangement of parts may be resorted to without departing from the spirit of the invention, or the scope of the subjoined claims.

Having thus described my invention, I claim:—

1. A stuffing box comprising a tubular base provided with an upwardly extending sleeve, a ring on said sleeve, an apertured tubular packing cage detachably secured to said base and surrounding said sleeve, a ring formed on the interior of said cage adjacent its upper extremity and co-operating with the sleeve ring for retaining the packing in said cage, a polish rod positioned in said base and sleeve and an aperture formed in said cage whereby access may be had to the packing surrounding the polish rod.

2. A stuffing box comprising a cylindrical base, a polish rod extending through said base, packing positioned about said polish rod, means for retaining the packing about said rod, a tubular member detachably secured to said base and provided with an opening therein, a collar detachably secured to said tubular member, and having an opening adapted to register with the aperture in said tubular member, and a bushing carrying cover detachably secured to said tubular member adjacent its upper extremity.

3. A stuffing box for a polish rod comprising a tubular base, an upwardly extending sleeve carried by said base and having an outer retaining ring thereon, an apertured tubular cage detachably secured to said base and provided with an inner retaining ring, said rings co-operating to retain the packing about the rod and sleeve, and a rotatable collar carried by said base and tubular cage, and having an opening therein adapted to register with the aperture of the cage.

In testimony whereof I affix my signature.

CHARLES L. PRUIETT.